United States Patent [19]  [11] 4,021,346

Berthiaume  [45] May 3, 1977

[54] FILTER FOR PLASTIC EXTRUDING MACHINE

[76] Inventor: Robert L. Berthiaume, 141 Floral St., Shrewsbury, Mass. 01545

[22] Filed: Mar. 17, 1975

[21] Appl. No.: 558,843

[52] U.S. Cl. .............................. 210/179; 210/184; 210/236; 210/387; 210/447; 210/DIG. 15
[51] Int. Cl.² ....................................... B01D 29/02
[58] Field of Search ...................... 210/232, 71–77, 210/97, 184, 387, 447, DIG. 15, 236, 230; 425/84, 183, 185; 264/318

[56] References Cited

UNITED STATES PATENTS

| | | | |
|---|---|---|---|
| 3,150,222 | 8/1976 | Blaustein et al. | 264/318 |
| 3,356,217 | 12/1967 | Emele | 210/230 |
| 3,471,017 | 10/1969 | Kalman | 210/77 X |
| 3,645,399 | 2/1972 | Kalman | 210/77 |
| 3,804,758 | 4/1974 | Cooper et al. | 210/DIG. 15 |
| 3,817,377 | 6/1974 | Piggott | 210/DIG. 15 |
| 3,856,680 | 12/1974 | Elmore | 210/447 X |
| 3,876,545 | 4/1975 | Norwood | 210/DIG. 15 |
| 3,940,335 | 2/1976 | Kalman | 210/77 |

*Primary Examiner*—Theodore A. Granger
*Attorney, Agent, or Firm*—Charles R. Fay

[57] ABSTRACT

Apparatus for filtering heat-softened plastic material under pressure of extrusion comprising a substantially continuous screen with screw means for positively moving the same past the filtering area, said screw means being located in a passage open to the fluid plastic material, with means to harden the plastic material in the passage into a nut in which the filter is embedded. The screw means also functions to prevent the solidified slug (nut) from escaping, preventing leakage.

7 Claims, 2 Drawing Figures

FILTER FOR PLASTIC EXTRUDING MACHINE

BACKGROUND OF THE INVENTION

In the extrusion of plastic material, and especially in making films, it is a consideration to maintain the heat-softened plastic as clean as possible. If there is any interruption to flow of the plastic material as is occasioned for changing the filter or screen plate, unwanted downtime results. In addition, many of these films are of such a nature that they require a very high degree of virgin plastic but if the filtering could be improved upon, a lower percentage of virgin material could be used, thus lessening the cost of the ultimate product.

The present invention provides an apparatus which does not require sensitive, accurate, heating of the screen inlet and outlet ports in order to actuate the filter change. The screen inlet and outlet ports remain at the same temperature as during normal operation of the machine. In the present apparatus there is no leakage of the material being filtered and the present apparatus reduces the necessary heat zone requirement to one zone only, that is, for the melt stream only.

All the suggestions heretofore have inherent weaknesses. In changing screens, the blown film tower is apt to collapse resulting in very costly down time and in the case of prior art continually changing endless filters, there have been operational difficulties which are apt to require shutting off the operation and rearrangement of the filter parts, there also having been faults in operation not heretofore corrected.

It is the object of the present invention to provide a continuous screen filter which is positively and mechanically moved in order to change a portion thereof across the breaker plate, i.e., the filtering portion thereof and to render the operation of filtering continuous avoiding any kind of down time and increasing the degree of filtration such that a lesser degree of virgin material can be used in the extrusion process.

SUMMARY OF THE INVENTION

The basis of the present invention resides in the concept of providing mechanical means, i.e., one of the active parts for moving the screen to change the filtration area, from the plastic material itself which is being operated upon to carry out the extrusion process. To this end, a screw is provided in a passage to which the plastic material has access prior to flowing through the filter and breaker plate and through which the filter passes. The temperature is controlled to harden this fluid material not only embedding the filter, but about the screw forming thereby a plastic nut mating with the screw. It being desired to index the filter which essentially is endless, torque is applied to the screw exteriorly of the machine thereby leading the plastic nut outwardly from the machine. By turning the screw, the nut being urged outwardly, it separates from the molten plastic and since the filter is embedded in it, it moves the filter outwardy also, that is, it changes the position of the filter so that a new filter area is presented to the melt stream.

As this hardened plastic nut exits from the machine the fluid plastic material which is being fed toward and through the filter enters into the passage at the interior portion thereof and then again hardens, forming an additional slug (nut) in which the filter screen is embedded, and the prior slug (nut) can be sheared off.

It is the object of the present invention to provide a continuous filter which is positively moved in order to change the portion thereof across the breaker plate, i.e., the filtering portion thereof and to render the operation of the filtering operation continuous avoiding any kind of down time and increasing the degree of filtration such that a lesser degree of virgin material can be used in the extrusion process. This process provides positive motion of the filter, changing the filter area thereof, and this may be done continuously or at selected intervals. By thus providing a smooth fully operable screen moving device comprised of the plastic material itself in the form of a nut, the machine may work continuously without collapse of the blown film tower or other objectionable causes for down time, and a higher percentage of reworked material can be utilized to provide as good a product, thus rendering the final product less expensive.

PREFERRED EMBODIMENT OF THE INVENTION

Figure 1:
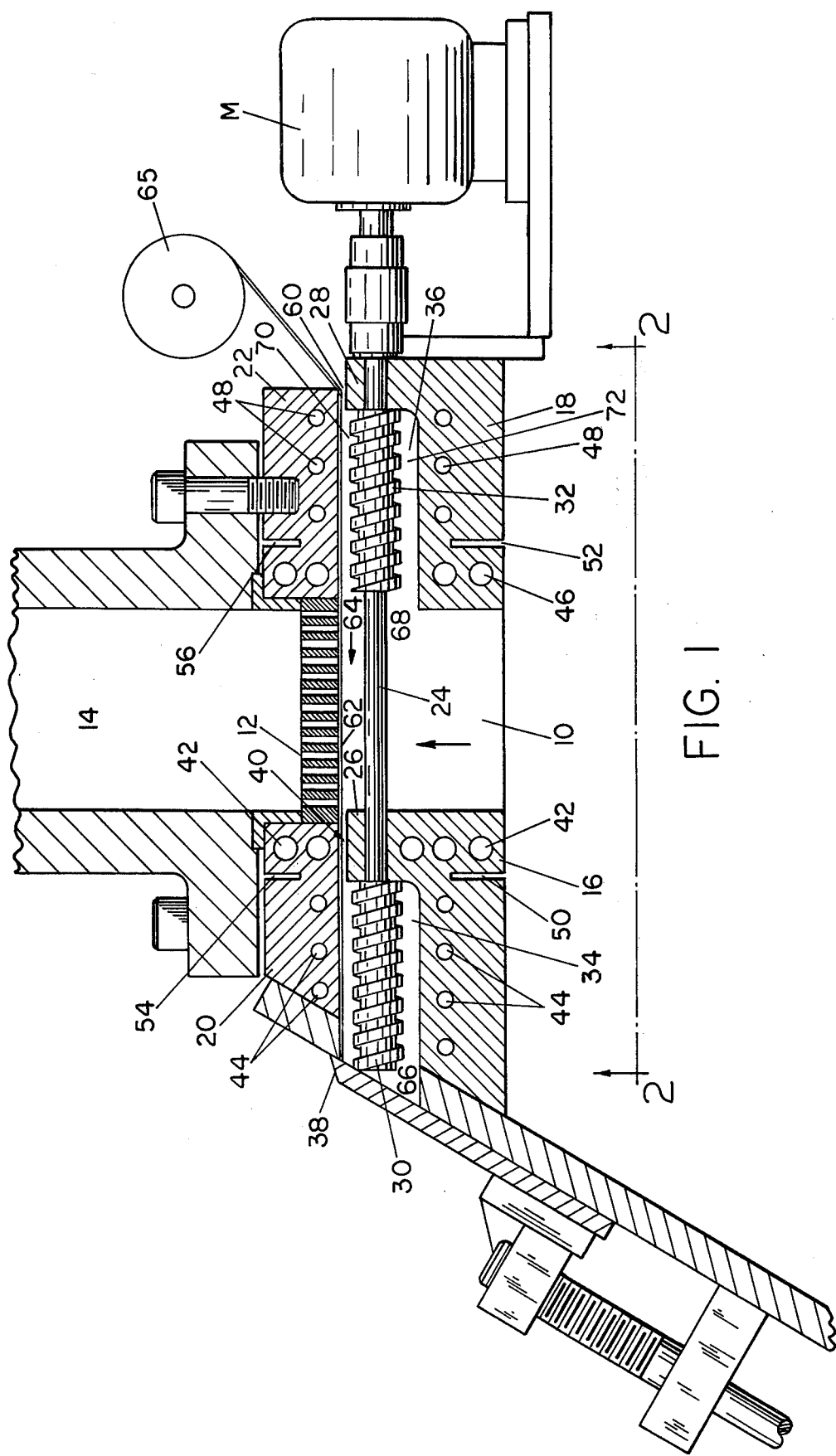
FIG. 1 is a horizontal sectional view through a cylinder of an extruder, illustrating the invention.
Figure 2:
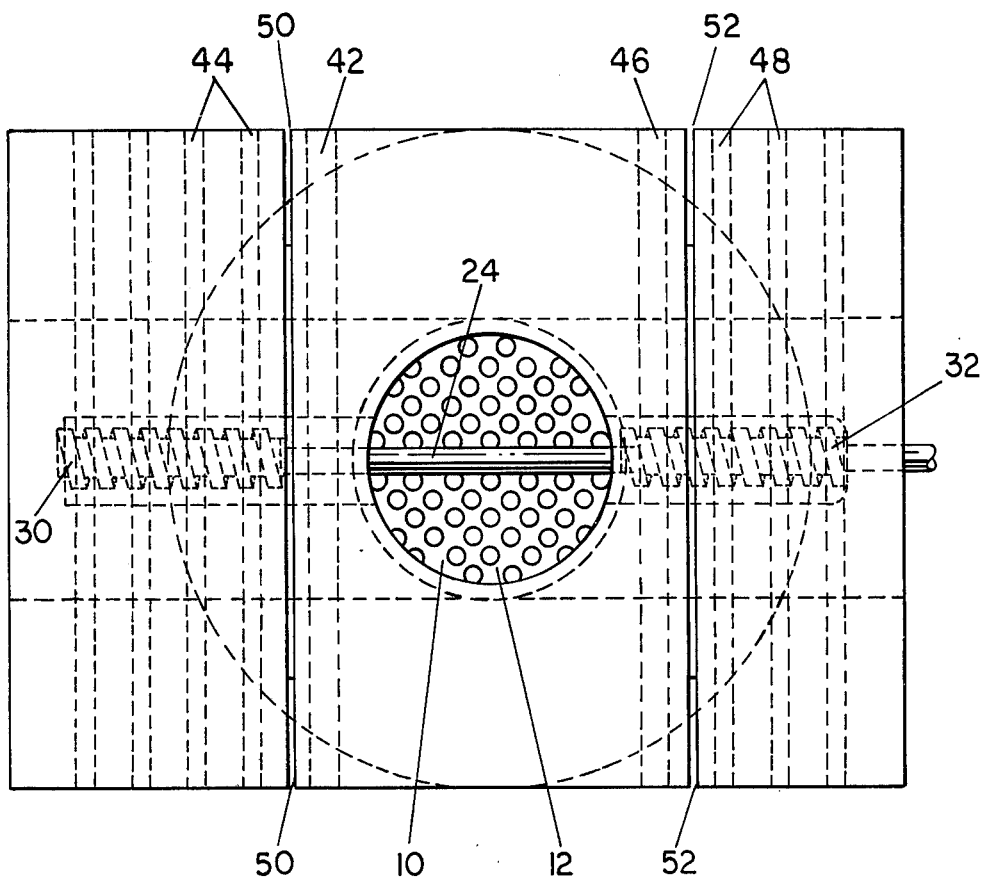
FIG. 2 is a section at right angles thereto, looking in the direction of the arrows 2, 2 of FIG. 1.

The reference numeral 10 indicates a cylinder that is a chamber for the stream of heat-softened material, or melt stream, moving in the direction of the arrow towards the breaker plate 12, this plate being of conventional construction and lying at the entrance to the chamber 14 in which the plastic advances. The chamber 10 is provided in a block or the like having portions 16 and 18 which surround the same. A further block including portions 20 and 22 holds the breaker plate more or less as well known in the art and also forms the chamber 14.

Extending diametrically across chamber 10 there is a shaft 24 which is journaled in the block portions 16 and 18 as at 26 and 28 and is adapted to be rotated by a motor M supported in any way desired on the machine frame.

There are two screws 30 and 32 on shaft 24 in the embodiment presented herein although the machine may operate with only screw 30, screw 32 in some cases being omitted. These screws are located in passages 34, 36 both of which taper to widen slightly from right to left, passage 36 into chamber 10, and passage 34 to the atmosphere. Passage 34 is normally closed by means of a cut-off blade 38 and both passages are normally full of plastic material which is generally fluid in the space 40 between the block 16 and block 20 being heated through passages 42. The plastic material freezes in the area at 34 being cooled by passages 44.

A somewhat similar construction obtains as to screw 32, the reference numeral 46 indicating heating passages and those at 48 representing cooling passages. The heated and cooled areas are generally isolated by gaps 50, 52, 54 and 56.

The passage 36 has an inlet at 60 for the filter screen generally indicated at 62, to be moved in the direction of the arrow 64 in order to present new filter surfaces to the melt stream. The filter screen may come from a continuous supply generally indicated at 65 mounted in any desired fashion. The passage 34 has an outlet 66 through which the screen passes.

The knife 38 is reciprocal to open the left-hand end of passage 34 by any desired means and also to cut off an extending frozen piece of plastic and screen as will appear hereinafter.

In general, the operation of the device is that, assuming the screen is in the position shown, it is frozen into the plastic slug, or nut in passage 34 but at the area 40 the plastic is molten. In the passage 36 the plastic is molten at the area 68 but is frozen in the area 70. This is not only because of the heat of the material itself in chamber 10 but because of the heating units 42, 46 and cooling units 44 and 48. When the motor M is energized, the screws turn, forcing the plastic plugs one at 66 and one at 72, toward the left. The knife blade 38 must of course be retracted for the plug 66 to start to exit from passage 34, the pressure of the material in chamber 10 keeping passage 34 filled. Molten material extends through passage 40, becoming frozen at the beginning of the screw again, so that passage 34 is always full.

The plastic material in passage 36 upon being moved to the left comes molten again and the pressure of the material in chamber 10 maintains chamber 36 full of plastic material regardless of the frozen condition of the plastic material in the area at 70. Since there are two plastic plugs which are frozen with the screen 62 embedded therein, the screen obviously must move with the plugs and the degree of this motion and the timing of the action depends upon determinations made by the operator of the machine, or by computerized determinations of conditions.

The start of the cycle may be initiated either manually or timed automatically. The cut-off blade 38 retracts and actuates the limit switch which in turn signals the screen advance screws to rotate, thus advancing the screw. The screen advance drive motor starter is actuated by a timer and the length of time that it remains energized determines the amount of virgin filter media which will be advanced into the melt stream. Deenergization of the screen advance drive motor signals the cut-off blade to advance and shear the plug which has exited from the screen outward toward the area at 66. Completion of this shear makes the limit switch and resets controls for the next cycle with the outlet closed by the blade of the knife for further operation of the screen.

It will be seen that the objects of the invention have been carried out and that there is no interruption to the flow of the plastic material through the breaker plate so that operation of the machine is continuous and there will be no down time. This is due to the fact that the screen filter is moved positively and mechanically and will not break as has happened in prior art devices.

The present invention provides an apparatus which does not require sensitive, accurate, heating of the screen inlet and outlet ports in order to actuate the filter change. The screen inlet and outlet ports remain at the same temperature as during normal operation of the machine. In the present apparatus there is no leakage of the material being filtered and the present apparatus reduces the necessary heat zone requirement to one zone only, that is, for the melt stream only.

I claim:

1. Apparatus for filtering heat-softened plastic material, comprising a chamber through which the heat-softened material is forced to flow unidirectionally, a transverse passage including said chamber, filter means in the form of a generally continuous screen located in said passage to travel generally at least in part across the flow of the softened material through the chamber, inlet and outlet ports for the screen, the heat-softened material entering said passage, means to cool the heat-softened material to a hardened state in which the screen filter is embedded, a unidirectional rotatable screw located in the passage and engaging said hardened material and forcing the same in a direction causing the embedded screen to move in said direction presenting a new increment of filter to the chamber, and means to rotate the screw unidirectionally, said screw being wholly embedded in the hardened plastic material.

2. The device of claim 1 wherein the outlet port for the filter is also for exit of the hardened material under the influence of said screw.

3. The apparatus of claim 2 including cooling means at the inlet port and the outlet port.

4. The apparatus of claim 1 including a second screw, said screw being located one at each side of the chamber.

5. The apparatus of claim 1 including a shaft extending across the chamber, said screw being mounted on said shaft and driven thereby.

6. The apparatus of claim 5, wherein a second screw is located in spaced relation on the shaft.

7. In a filter for a plastic extrusion machine wherein the filter is substantially endless, that improvement which comprises a chamber, a screw located in the chamber to which the molten plastic melt stream has access, inlet and outlet ports in the chamber for the filter, the filter passing through the chamber and becoming embedded in the plastic flowing into the chamber, and means for controlling the temperature of the plastic so that it freezes with the filter and screw embedded therein, forming a plastic nut completely about the screw, means to unidirectionally rotate the nut together with the filter to present a new filtration portion of the screen to the melt stream by turning the screw and separating the plastic nut from its cavity walls, the fluid plastic material then forming an additional nut which also embeds the filter therein.

* * * * *